United States Patent [19]

Kahn

[11] Patent Number: 4,931,771
[45] Date of Patent: Jun. 5, 1990

[54] OPTICAL FIBER INTRUSION LOCATION SENSOR FOR PERIMETER PROTECTION OF PRECINCTS

[75] Inventor: Walter K. Kahn, Bethedsa, Md.

[73] Assignee: Anro Engineering, Inc., Lexington, Mass.

[21] Appl. No.: 249,823

[22] Filed: Sep. 27, 1988

[51] Int. Cl.⁵ .............................................. G08B 13/18
[52] U.S. Cl. ................................ 340/556; 250/227.14; 340/525
[58] Field of Search ............... 340/556, 555, 557, 550, 340/524, 525, 541, 666; 250/227, 231 R; 73/705

[56] References Cited

U.S. PATENT DOCUMENTS

| | | | |
|---|---|---|---|
| 4,297,684 | 10/1981 | Butter | 340/557 |
| 4,342,907 | 8/1982 | Macedo et al. | 250/227 |
| 4,443,700 | 4/1984 | Macedo et al. | 250/227 |
| 4,459,477 | 7/1984 | Asawa et al. | 250/227 |
| 4,482,890 | 11/1984 | Forbes et al. | 340/556 |
| 4,591,709 | 5/1986 | Koechner et al. | 250/221 |

Primary Examiner—Reinhard J. Eisenzopf
Assistant Examiner—Robert W. Mueller
Attorney, Agent, or Firm—George Grayson

[57] ABSTRACT

A Precinct Protection System includes a laser source of light which is applied at the input to a bundle of light transmissive fibers. The fibers are gathered in a cable in loops of varying lengths so that the fibers enter and exit the cable at one and the same end. The cable is placed along a line adjoining or surrounding the precincts to be protected. An intruder traversing the line or protected perimeter will disturb one or more of the fiber optic loops of the cable. The circumstance and locality of the disturbance produced by the intruder are indicated on an analog or digital display.

13 Claims, 4 Drawing Sheets

PERIMETER PROTECTION SYSTEM I

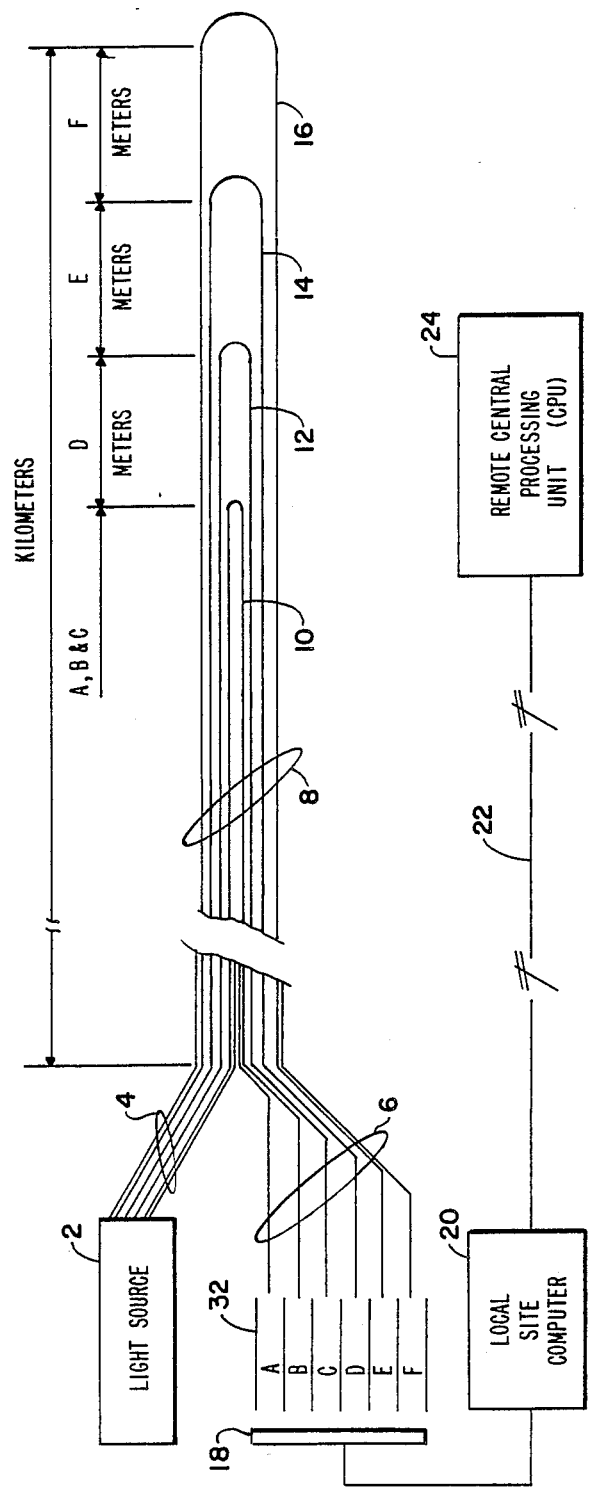

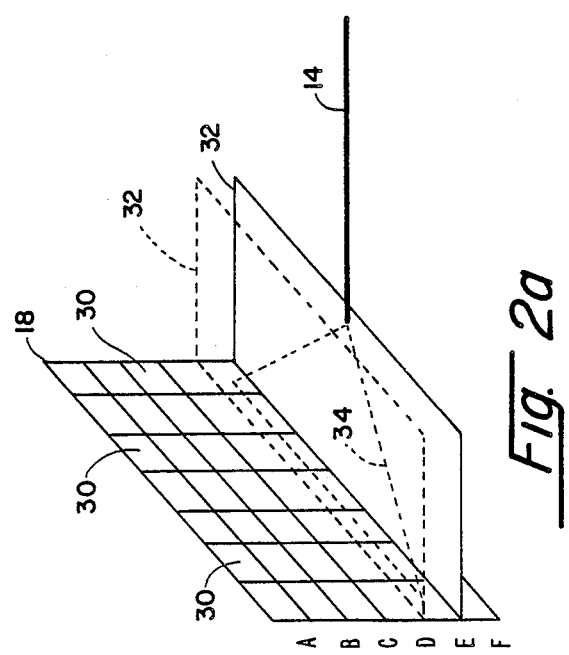
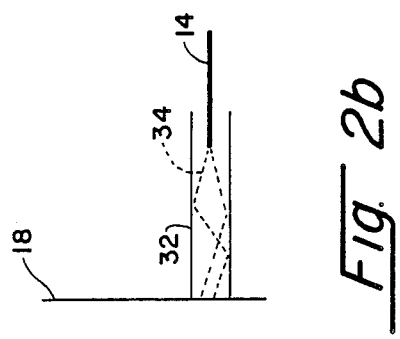

OPTICAL FIBER INTRUSION LOCATION SENSOR FOR PERIMETER PROTECTION OF PRECINCTS

BACKGROUND OF THE INVENTION

1. Scope of the Invention

This invention relates to the perimeter security and surveillance field, and more particularly to the use of fiber optic bundles for protecting the perimeter of an extended area precinct by detecting traverse of the perimeter by an intruder and localizing the point at which the perimeter was traversed.

2. Description of the Prior Art

There is a need to provide an economic means to protect literally miles of a preferred perimeter against unauthorized intruders under all conditions. A number of perimeter protection schemes have aimed to accomplish this. These schemes include the use X-band line-of-sight radar beams, free space infrared surveillance equipment, and buried leaky wave coaxial cables.

These systems have known limitations. For example, radar and free-space infrared systems are limited in their reliability and range by beam spreading, sidelobes, and variable attenuation due to weather conditions. Leaky wave systems are severely range limited (hundreds of feet) and are costly to install and maintain.

These limitations are overcome by fiber optic sensors which can be deployed over several miles and are also immune from electromagnetic interference (EMI) electromagnetic pulses (EMP).

Fiber optic sensor technology is described in an Optical Engineering/March/April 1985/Vol. 24 No. 2 article by Charles M. Davis entitled "Fiber optic sensors: an overview". The optic sensors in the article depend on the creation of sufficient distortion of the fiber to give rise to a dependably detectable reflection; or a sufficient distortion of the fiber to cause a dependably detectable change in transmission amplitude (power). These schemes utilize special localized (periodically repeated) sensor components or periodically repeated special sensitizing features, such as microbend deformers. Alternatively the fiber may be terminated in a mirror and interference between the incident and reflected wave detected. Such interferometer-detector arrangements are extremely delicate and prone to false alarms.

U.S. Pat. No. 4,696,889 discloses a method and apparatus wherein the exiting light from the trunk of a fiber optic assembly is projected onto a single photosensitive surface.

OBJECT OF THE INVENTION

It is an object of the invention to have an improved perimeter protection system.

It is another object of the invention to have a more cost effective perimeter protection system.

It is yet another object of the invention to have a system with a greater probability of intrusion detection.

It is still another object of the invention to have a system with the capacity to localize the point of intrusion to within a particular several meters of the protection line.

It is yet another object of the invention to render the detection system insensitive to details of terrain, electromagnetic interference and initial placement of the cable.

SUMMARY OF THE INVENTION

The above objects and advantages are achieved in a preferred embodiment of the present invention. According to the preferred embodiment, the Perimeter Protection System includes a cable made up of a multiplicity of multimode gradient index fiber loops which receive light energy from a laser source. The propagation of light waves through each fiber generally takes the form of a meandering beam.

The lengths of the fiber loops differ by predetermined amounts according to the precision within which the location of an intruder needs to be delimited within the complete perimeter to be protected. The arrangement loop within the cable is such that an intruder will disturb one loop over the length furthest from the light source, two loops over the next length, and all of the loops over the length nearest the light source.

The output beam from each fiber is projected onto a display. The display includes a number of areas, one for each fiber. Each area is optically isolated by a pair of mirrors or optical equivalent. For example, the boundaries of a clear slab (step index slab fiber) act as mirrors by total internal reflection.

Each area includes a number of photo-receptors. With no intruder, each fiber excites one cell in its respective area. When an intruder disturbs any part of the cable, minute distortions in the disturbed fibers are induced. In view of the large number of axial periods of the beam affected, the position and slope of the output beam is altered. These dynamic changes are captured on a display and interpreted by an operator or alternatively, they may be stored in a computer, processed and interpreted automatically.

After detecting an intruder, the system reverts to a (new) state of readiness as required to detect a subsequent intrusion in the same manner as described above. The analog display could be a persistent photosensitive screen. The time constant governing the persistence is so chosen that points not constantly illuminated by light arriving from a fiber will fade in some predetermined time, the reset time, fixed initially in the design or variable at the command of the system operator. Since the positive indication of the system derive from the observation of dynamic changes, it is not required that this new final quasi-static state of the analog display, arrived at after the dynamic changes concomitant with an intrusion which led to the characteristic display signaling this fact and the location of the intrusion, be the same as the initial state before the disturbance.

Each area may include a number of cells. Each cell will generate an electrical signal when exposed to the output beam. A digital display will display a decimal count of the number of generated signals.

Another alternative may be to provide an alphanumerical display responsive to the generated signals to spell out the intrusion location.

The novel features which are believed to be characteristic of the invention both as to its organization and method of operation, together with further objects and advantages will be better understood from the following description when considered in connection with the accompanying drawings. It is expressly understood, however, that each of the drawings is given for the purpose of illustration and description only and is not intended as a definition of the limits of the present invention.

DESCRIPTION OF THE DRAWINGS

FIG. 1 shows an overall block diagram of the Perimeter Protection System.

FIG. 2a shows the projection of an output beam from a fiber optic loop onto a display.

FIG. 2b shows a side view of the output beam being reflected onto a display area by a pair of mirrors.

DESCRIPTION OF THE PREFERRED EMBODIMENT

Figure 3:
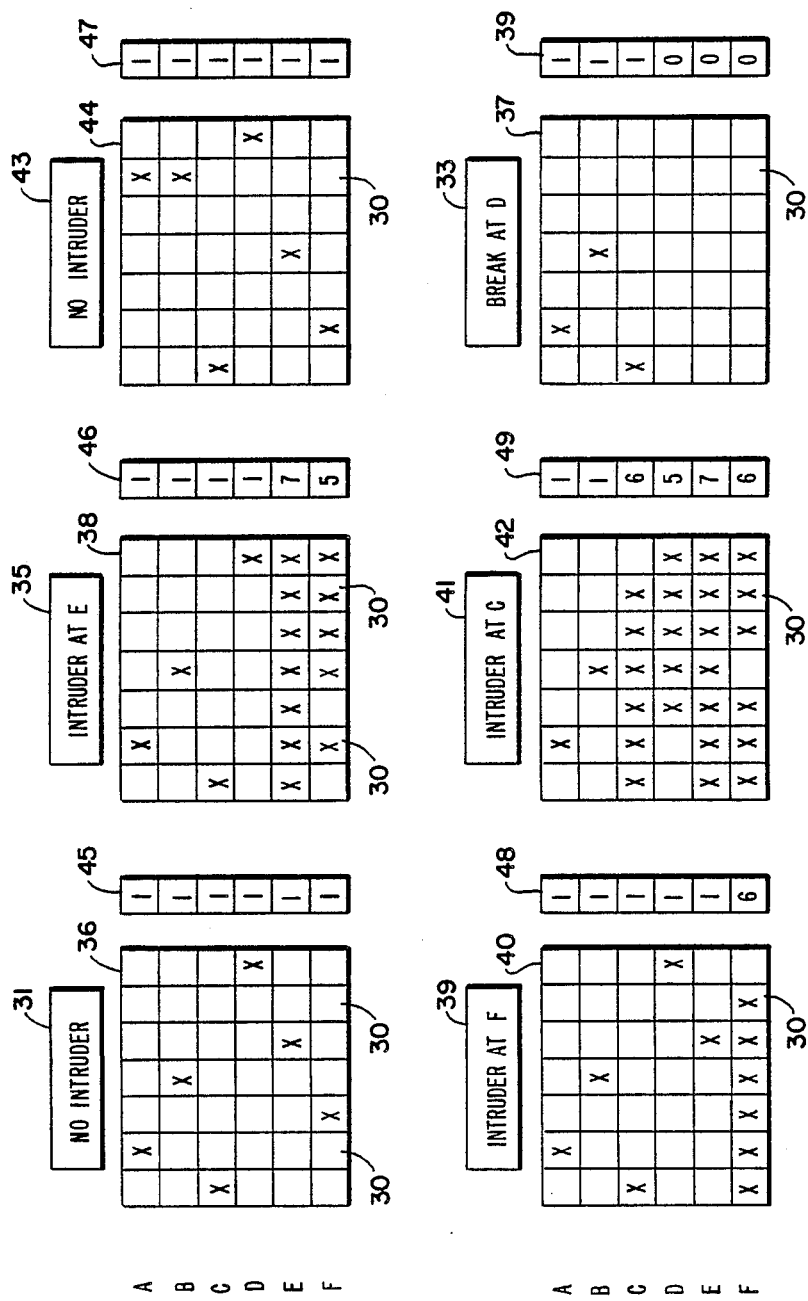
FIG. 3 shows the various display configurations.

FIG. 1 shows an overall diagram of a perimeter protection system 1 using fiber optics as the means of sensing the location at which an intruder crossed the perimeter of a protected area. A light source 2 typically a commercially available coherent CW laser source provides light energy to one end of a cable 4 made up of a multiplicity of commercially available high numerical aperture (N.A.=0.2 to 0.3) multimode gradient index fiber optic loops 10, 12, 14 and 16 contained in a sensor cable 8. Note that for the simplicity of the description, only four loops are identified specifically, it is obvious that many more loops are feasible. For example, a two kilometer cable 8 could comprise twenty optical fiber loops with the capacity to detect traverse of the two kilometer line protected by the sensor cable by an intruder with the capacity to localize the point of intrusion within one of the twenty 100 meter long (incremental loop) lengths along the cable 8.

The loops 10, 12, 14, and 16 terminate in a cable 6 and the output light beams are projected directly as well as reflected by mirrors 32 onto selected row areas of a photo-receptor display 18. The mirrors 32 also optically isolate the row areas A through F of display 18 from each other.

The cable 8 is installed along the periphery of the area precincts to be protected and may be a number of kilometers long. Each successive loop protects an additional incremental length of the periphery up to typically 100 meters. Loop 16 protects incremental length F, loop 14 protects length E, loop 12 protects length D, loop 10 protects length C, and loops not shown protect lengths B and A respectively. The output beam from loop 16 is sensed by row area F of display 18. Similarly, the output beams from the other loops are sensed by their respective row areas. Therefore periphery lengths A through F are reflected in row areas A through F of display 18.

The output of display 18 may be applied to a Local Site Computer 20. A remote CPU 24 may receive information on an intrusion into the protected area over communication lines 20 to alert personnel to take a prescribed action.

Propagation within a gradient index fiber generally takes the form of a beam or beams. The beams meander through the fiber, i.e. the center of the beam follows a trajectory which oscillates about the fiber axis. The amplitude and character of a particular meander trajectory depends on the initial conditions of beam injection as well as imperfections of the fiber. The axial period of the oscillation is determined by the gradient index profile, but is generally of the order of several fiber diameters.

It is well known that mechanical distortion of the fiber, such as may be produced by a footstep on the cable 8, induces minute distortions in the fiber, which, in view of the large number of axial periods affected, completely alter the position and slope (center and phase front) of the output beam. This change is, of course, a dynamic one. As the pressure of the footstep increases from zero to its maximum value, the position and the slope of the output beam continuously varies through all possible positions of its range.

If an intruder steps on cable 8 in length E, then only loops 14 and 16 are distorted. This distortion is sensed by display 18 in row areas E and F. Row areas A, B, C, and D of display 18 show no change since the shorter loops are not distorted. In the instance of buried cables, the probability of detection of an adult intruder is increased by the use of three cables 8 placed approximately 25 centimeters apart.

A radical trauma to the sensor cable 8, such as one that results in the cable 8 being cut into two parts, anywhere along its length would be immediately apparent from a characteristic display. For example, a cut through segment D would result in the complete blanking of row areas D, E and F of display 18.

FIGS. 2a and 2b show the projection of the beam from the end of loop 14 onto a row area E on display 18. Each row area A through F contains a number of cells 30. Each cell may be typically a photo-detector or an area on the face of a cathode ray tube (CRT).

Referring to FIG. 2a, the spacial sector available to the beam 34 would be conical in shape if it were not limited by the reflecting surfaces of the two mirrors 32 which bound row area E. FIG. 2b shows a side view of a typical beam 34 from the end of fiber loop 14 being reflected by the two mirrors 32 onto the cells 30 of display 18.

FIG. 3 shows the configurations 38, 40 and 42 of the cells 30 on the surface of display 18 the instant the intruder disturbed a length of cable 8, FIG. 1. Also shown are two possible steady-state configurations 36 and 44.

Assume cable 8 was buried sufficiently below the earth's surface to avoid exposure and yet close enough to the earth's surface so that enough force resulting from the intruders footprint is transferred through the earth to perturb the fiber optic line. If the fiber optic line is not restored to its previous fiber optic line, then a new steady-state configuration 44 will result. A change therefore in the new steady-state configuration may again indicate the presence of any later intruder.

The dynamic character of the positive indication of an intruder and the ability of this system to accept any new steady-state configurations reduces considerably the probability of false alarms due to changing weather conditions or after disturbance of the system by authorized or detected innocent passage.

Configuration 36 shows that each loop 10 through 14 and the two loops not shown excite one cell 30 of their respective row areas A through F indicating that no part of any cable 8 length A through F is being disturbed.

Configuration 38 indicates that the intruder is stepping on cable 8 somewhere along length E thereby disturbing only loops 14 and 16. The loops 10 and 12 as well as the loops not shown are not disturbed. Cells 30 of row areas E and F are therefore excited.

Configurations 40 and 42 indicates the intruder at lengths F and C respectively of cable 8.

Configuration 37 and digital display 39 report a break in cable 8 at location D.

Only six loops are shown to describe the invention. The presence of more than one loop with incrementally increasing length is an essential feature of the invention. Once this feature has been recognized, it becomes obvious for one of ordinary skill in the art to install such a system having many loops which excite many row areas.

The persistent photosensitive display 18 may be replaced by a matrix of photo-diodes, or equivalent, the output of which is processed by a computer and stored as a set of sub-arrays of 1 (lit) and 0 (dark), one sub-array corresponding to each row area A through F of display 18 of FIG. 1.

Digital displays 39 and 45 through 49, each comprise one column of integers, each such integer being equal to the sum of all the elements in one sub-array. The quasi-static quiescent state of configurations 36 and 44 then corresponds to a column of all 1's as shown by displays 45 and 47 respectively. These sums are recomputed periodically at some convenient interval, typically on the order of one second. A pattern of integers corresponding to the number of loops will signal the fact and locality of a disturbance of cable 8 as an attempted traverse of the protected line. This is demonstrated by configurations 36, 38, 40, 42 and 44 with their respective digital displays 45, 46, 48, 49 and 47. The automated interpretation of a digital output of the sort described above is well known in the art.

The local site computer 20 may receive the signals from the display 18 which correspond to the light pattern on each array to show the configuration. A cathode ray tube or a printer (not shown) of computer 20 may show the status of the active configuration. Configurations 36, 37, 38, 40, 42 and 44 are typical examples. Corresponding alphanumeric displays 31, 33, 35, 39, 41 and 43 indicate the status which is updated periodically. The computer display may be reset automatically to a quiescent state after the intrusion has been noted. The computer 20 display is accomplished by techniques well known in the art.

Figure 4:
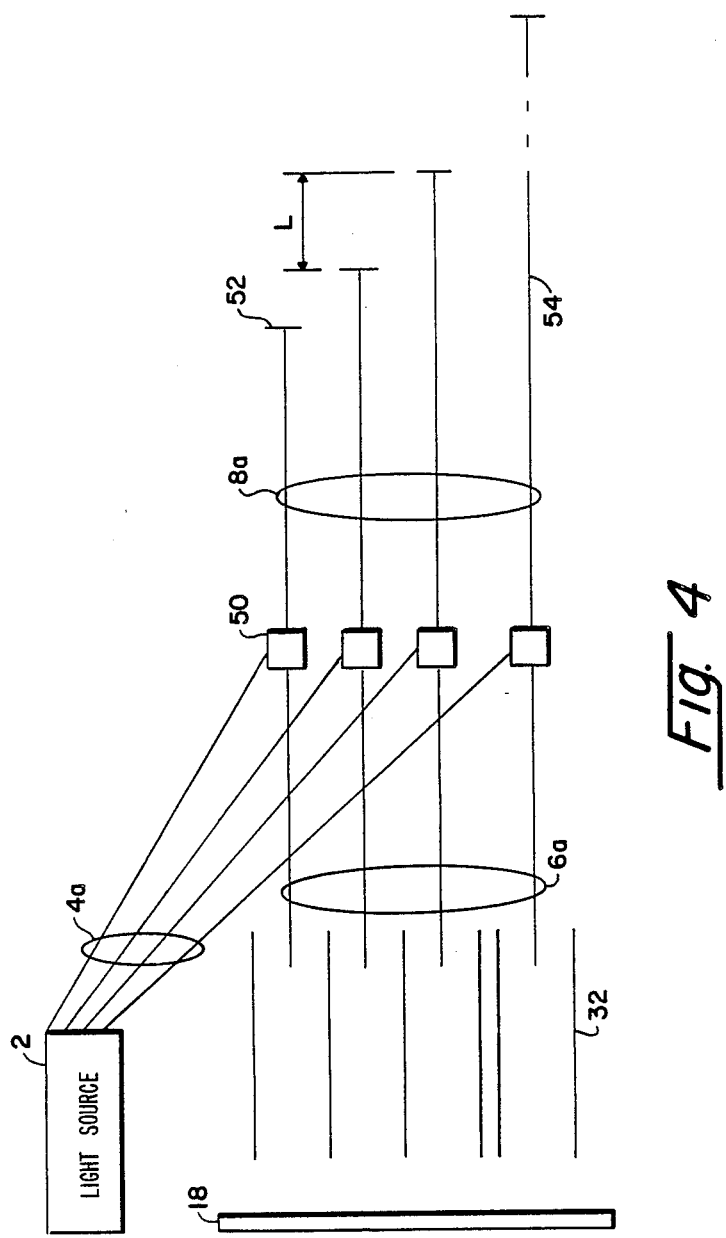
FIG. 4 shows another embodiment of the invention.

FIG. 4 shows another embodiment of the invention. A laser source of light 2 applies light energy to one end of a cable 4a comprising a multiplicity of multimode gradient index optical fibers 54. The beam passing down each length of fibers 54 in sensor cable 8a is reflected at the far end by a mirror 52, and retaining the essential off-axis beam characteristics is coupled out of that input fiber by a special directional coupler 50 and exits to display 18 between pairs of mirrors 32 as cable 6a. In this application it is essential that the nature and intensity of the coupled beam depends on the particular meander trajectory of the input beam, a quality normally deprecated in commercial couplers. The operation is then similar to that of the fiber loops 10, 12, 14, and 16 of FIG. 1. Here, single optical fibers differing in length by values of approximately L meters, enable the fact and location of the intrusion to be detected. It is understood that the computers 20 and 24 of FIG. 1 may readily be coupled to the system of FIG. 4.

The gradient index fiber coupler 50 should have a nominal coupling value on the order of about −10 dB. A marginally suitable commercial gradient index multimode coupler 50 is an Amphenol 946-110-2210. Design considerations for couplers especially designed for the present application have been developed in another connection. {Anro Engineering Consultants, Phase I Final Report Fiber Optic Multimode Feed for Monopulse LIDAR, Contract No. DNA001-87-C-0041, 30 Sept. 1987}

While the invention has been shown and described with reference to the preferred embodiment thereof, it will be understood by those skilled in the art that the above and other changes in form and detail may be made therein without departing from the spirit and scope of the invention.

What is claimed is:

1. A perimeter protection system for use in indicating the location of an intrusion into a protected area, said system comprising:
   a light source for generating a light beam;
   display means having a plurality of display areas;
   a plurality of multimode gradient index optic fiber loops, each varying in length from each other by predetermined amounts and having every portion highly sensitive and substantially uniformly sensitive to an external disturbance applied at any point, said each having an input end coupled to said source of light for receiving said light beam, and said each loop having an output end coupled to said display means for projecting said light beam propagated along the length of said each of said plurality of optic fiber loops onto a different one of said plurality of display areas,
   said plurality of multimode gradient index optic fiber loops forming a cable and having said input and said output ends at one end of said cable, said cable being positionable around a periphery of said protected area, said plurality of multimode gradient index optic fiber loops being positioned in said cable so that the distance along the cable of successive loops is equal to said predetermined amounts,
   said each of said plurality of multimode gradient index optic fiber loops when in an undisturbed state conducting said light beam which projects a first type of pattern from said second end and when disturbed projects a dynamically varying beam which produces a transient characteristic second type of pattern from said second end;
   said display means sensing said first type of pattern projecting onto each of said plurality of display areas, indications representing that there was no intrusion into said protected area, and sensing said second type of pattern projecting onto one or more of said plurality of display areas, indications representing the location of the intrusion.

2. The system of claim 1 wherein said display means comprises:
   said plurality of display areas each having a plurality of cells, each of said plurality of cells having means for sensing said light beam for display.

3. The system of claim 2 wherein said display means further comprises:
   a plurality of pairs of reflecting means for reflecting said light beams from each of said second ends of said plurality of optic fiber loops onto said different one of said plurality of display areas,
   said plurality of pairs of reflecting means being mounted in a parallel position to each other, and each of said pair being perpendicular to and bordering opposite boundaries of their respective display areas so that said each of said plurality of cells is adjacent to each of said pair, thereby optically isolating said each of said plurality of display areas from each other.

4. The system of claim 3 wherein said sensing means comprises:

photo-detector means responsive to said light beam for generating a visual indication of said each of said plurality of cells being exposed to said light beam.

5. The system of claim 4 wherein said each of said plurality of display areas having said visual indication representative of a transition from said first type of pattern to said second type of pattern, the location of the intrusion being representative of said one of said plurality of display areas at said transition having a multiplicity of visual indications.

6. The system of claim 5 wherein said sensing means further comprises:
said photo-detector means responsive to said light beam for generating an electrical signal for each of said plurality of cells being exposed to said light beam.

7. The system of claim 6 wherein said display means further comprises:
digital display means coupled to said each of said plurality of display areas for displaying a count of the number of said electrical signals received from said each of said plurality of display areas.

8. The system of claim 7 wherein said display means further comprises:
alphanumerical display means coupled to said each of said plurality of display areas for displaying a message indicating the location of the intrusion.

9. The system of claim 8 wherein said display means further comprises:
computer means coupled to said plurality of display areas and said alphanumeric display means and responsive to said electrical signals for providing indications representative of said transition, the location of the intrusion being representative of said one of said plurality of display areas at said transition generating a multitude of electrical signals, said computer means being responsive to said multitude of electrical signals for generating said message.

10. The system of claims 9 wherein displays of said first and said second types of patterns remain persistent and are updated after a predetermined time.

11. The system of claim 1 wherein said light source is a laser.

12. A perimeter protection system for use in indicating the location of an intrusion into a protected area, said system comprising:
a light source for generating a light beam;
display means having a plurality of display areas;
directional coupler means for directing said light beam;
a first plurality of optic fibers, said each having an input end coupled to said light source for receiving said light beam and an output end coupled to pass said light beam to said directional coupler means;
a second plurality of optic fibers, each varying in length from each other by predetermined amounts and having every portion highly sensitive and substantially uniformly sensitive to an external substance applied at any point, and said each having a First end coupled to said directional coupler means and propagating said light beam along the length of said each of said second plurality of optic fibers, said each of said second plurality of optic fibers having reflecting means coupled to a second end for reflecting said light beam the length of said each of said second plurality of optic fibers to said directional coupler means;
a third plurality of optic fibers having a third end coupled to said directional coupler means for receiving said light beam from corresponding fibers of said second plurality of optic fibers and having a fourth end coupled to said display means for projecting said light beam propagated along the length of said first, second and third plurality of optic fibers onto a different one of said plurality of display areas,
said second plurality of optic fibers forming a cable, said cable being positionable along a line adjoining or surrounding the precincts to be protected, said second plurality of optic fibers being positioned in said cable so that the difference in distance along the cable of successive lengths is equal to said predetermined amounts,
said second plurality of optic fibers when in an undisturbed state conducting said light beam which projects a first type of pattern from said fourth end and when disturbed projects a dynamically varying beam which produces a transient characteristic second type of pattern from said fourth end;
said display means sensing said first type of pattern projecting onto each of said plurality of display areas indications representing that there was no intrusion into said protected area, and sensing said second type of pattern projecting onto one or more of said plurality of display areas indications representing the location of the intrusion.

13. A method of protecting a precinct from intrusion, said method comprising the steps of:
A. Providing a light source:
B. Providing means for displaying visual indications within a plurality of display areas;
C. Providing a plurality of optic fiber loops, each differing in length by a predetermined amount and having every portion highly sensitive and substantially uniformly to an external disturbance applied at any point;
D. Gathering the loops in a cable with an input end and an output end at the same end of the cable;
E. Applying the light source to the input end;
F. Viewing the projections of a light beam that was propagated along each of said plurality of optic fiber loops onto a different one of said plurality of display areas;
G. Recognizing a first pattern indicating no disturbance along the length of the cable;
H. Recognizing a second pattern indicating that the cable was disturbed by an intruder and recognizing the location of the intrusion by the visual indications of the number of said plurality of optic fiber loops disturbed.

* * * * *